United States Patent
Hara et al.

(10) Patent No.: US 8,403,461 B2
(45) Date of Patent: Mar. 26, 2013

(54) AQUEOUS INKJET INK

(75) Inventors: Takafumi Hara, Shizuoka-ken (JP);
Ryozo Akiyama, Shizuoka-ken (JP);
Maiko Yoshida, Shizuoka-ken (JP);
Chie Tonohiro, Shizuoka-ken (JP);
Atsushi Kubota, Shizuoka-ken (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 152 days.

(21) Appl. No.: 13/097,651

(22) Filed: Apr. 29, 2011

(65) Prior Publication Data

US 2011/0273515 A1    Nov. 10, 2011

Related U.S. Application Data

(60) Provisional application No. 61/331,120, filed on May 4, 2010.

(51) Int. Cl.
*B41J 2/045* (2006.01)
*C09D 11/02* (2006.01)

(52) U.S. Cl. .................... 347/68; 106/31.86
(58) Field of Classification Search ............ 347/95–100; 106/31.13, 31.6, 31.85, 31.86
See application file for complete search history.

(56) References Cited

U.S. PATENT DOCUMENTS

| 6,770,689 B1 * | 8/2004 | Yoshimura et al. ........... 523/161 |
| 2005/0204957 A1 | 9/2005 | Momose et al. |

FOREIGN PATENT DOCUMENTS

| JP | 3760621 | 3/2006 |
| JP | 2006-159423 | 6/2006 |

* cited by examiner

*Primary Examiner* — Matthew Luu
*Assistant Examiner* — Lisa M Solomon
(74) *Attorney, Agent, or Firm* — Turocy & Watson, LLP

(57) ABSTRACT

According to one embodiment, an aqueous inkjet ink includes a dispersion medium that contains water and a water-soluble polyhydric alcohol having a weight average molecular weight of 400 or more, and a pigment. The pigment accounts for less than 5 mass % of the total amount of the aqueous inkjet ink. The aqueous inkjet ink has viscosities (mPa·s) measured using a cone-plate type viscometer at 20 rpm and satisfying the following relationships:

$V_A/V_B \geq 1.5$ $V_A \geq 10$ mPa·s $3$ mPa·s $\leq V_B \leq 15$ mPa·s, where $V_A$ is the viscosity at 30° C., and $V_B$ the viscosity at 45° C.

19 Claims, 1 Drawing Sheet

AQUEOUS INKJET INK

CROSS-REFERENCE TO RELATED APPLICATIONS

This application is based upon and claims the benefit of priority from U.S. Provisional Application No. 61/331,120 filed on May 4, 2010, the entire contents of which are incorporated herein by reference.

FIELD

Embodiments described herein relate generally to aqueous inkjet ink.

BACKGROUND

Aqueous inkjet ink as a dispersion of pigments dispersed in a water-containing dispersion medium generally contains a moisturizer that suppresses water evaporation. A viscosity adjuster that suppresses a viscosity increase caused by water evaporation is also generally contained in aqueous inkjet ink.

Polyhydric alcohol contained as the moisturizer has good compatibility to the main component cellulose of paper medium. The water-soluble organic solvent contained as the viscosity adjuster has high permeability to paper. The aqueous inkjet ink can thus easily permeate inside the paper medium, and the pigments in the ink usually do not remain on the surface of paper medium. In order to form an image of a desired density on paper medium, aqueous inkjet ink needs to contain pigments in amounts that take into account permeability for the paper medium.

However, the pigment content needs to be reduced to cut down the manufacturing cost of the ink.

DETAILED DESCRIPTION

Figure 1:
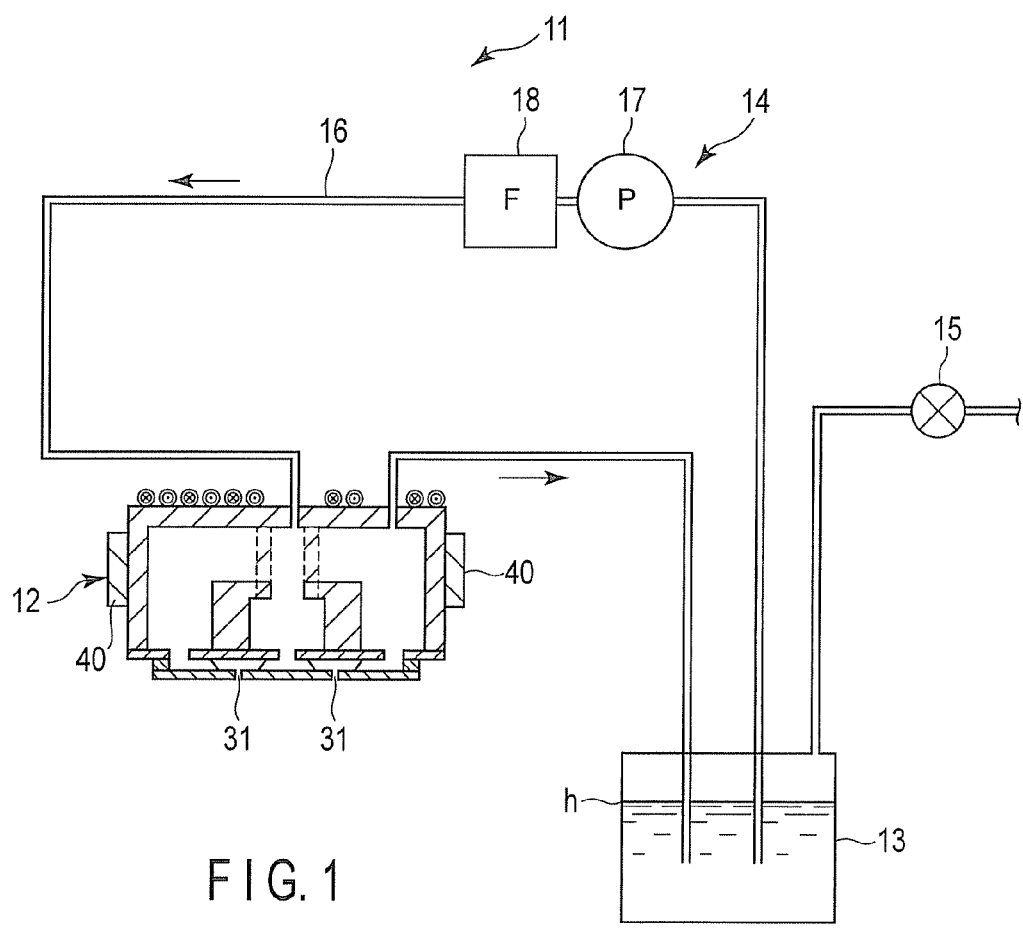
FIG. 1 is a schematic diagram illustrating an example of an inkjet recording apparatus.

In general, according to one embodiment, an aqueous inkjet ink includes a dispersion medium that contains water and a water-soluble polyhydric alcohol having a weight average molecular weight of 400 or more; and a pigment. The pigment content is less than 5 mass % of the total amount of the aqueous inkjet ink. The aqueous inkjet ink has viscosities (mPa·s) measured using a cone-plate type viscometer at 20 rpm and satisfying the following relationships.

$$V_A/V_B \geq 1.5$$

$$V_A \geq 10 \text{ mPa·s}$$

$$3 \text{ mPa·s} \leq V_B \leq 15 \text{ mPa·s},$$

where $V_A$ is the viscosity at 30° C., and $V_B$ is the viscosity at 45° C.

Hereinafter, embodiments will be specifically described.

The image density on paper medium can be increased if the permeation of the pigments into paper medium could be suppressed upon ejecting the aqueous inkjet ink onto the paper medium. The permeation of the ink into the paper medium is related to ink viscosity: increasing the viscosity of the aqueous inkjet ink suppresses the permeation of the ink into the paper medium. The pigments in the aqueous inkjet ink can thus remain in the vicinity of the paper medium surface, and the resulting image density can be improved.

The viscosity of the aqueous inkjet ink needs to fall in an appropriate range for stable ejection through an inkjet head. In the aqueous inkjet ink, the viscosity upon contacting the paper medium needs to be higher than the viscosity before ejection through the inkjet head.

The present inventors looked at an aqueous inkjet ink that has high viscosity at ordinary temperature (about 30° C.). The viscosity of such a high-viscosity inkjet ink decreases to a desired value upon being heated to a temperature of 45° C. or higher. The present inventors thus found the following relationship in the viscosity of the high-viscosity aqueous inkjet ink. The viscosity is the value measured with a cone plate-type viscometer at 20 rpm.

$$V_A/V_B \geq 1.5 \qquad \text{Equation 1,}$$

where $V_A$ is the viscosity at 30° C. $V_A$ substantially coincides with the viscosity of the ink upon contacting the paper medium after being ejected through an inkjet head. $V_A$ is specified at 10 mPa·s or more to suppress permeation of the ink into the paper medium. With $V_A$ equal to or greater than 15 mPa·s, the permeation of the ink into the paper medium can be suppressed more reliably.

$V_B$ is the viscosity at 45° C. $V_B$ substantially coincides with the viscosity inside the inkjet head. It can be said that the ink has viscosity $V_B$ until it is ejected through the inkjet head. $V_B$ is specified at 3 to 15 mPa·s to enable stable ejection through the inkjet head.

The viscosity of the aqueous inkjet ink satisfying Equation 1 increases after the ink is ejected through the inkjet head. The increase is at least 1.5 fold from the viscosity inside the inkjet head. With $V_A/V_B$ less than 1.5, the viscosity increase is insufficient, and the permeation of the ink into the paper medium can not be suppressed. $V_A/V_B$ is preferably 2.0 or more, in order to sufficiently suppress the permeation of the ink into the paper medium. As will be described later, the $V_A$ value is dependent on such factors as the type and content of the water-soluble polyhydric alcohol, and the upper limit is about 40 mPa·s. The upper limit of $V_A/V_B$ is calculated to be about 2.67.

The aqueous inkjet ink of the embodiment has high viscosity at ordinary temperature. An inkjet head having an ink circulation pathway and a heat-retaining function is used to stably eject the high-viscosity aqueous inkjet ink and form an image on paper medium.

FIG. 1 illustrates an example of an inkjet recording apparatus provided with such an inkjet head.

An inkjet recording apparatus 11 includes an inkjet head 12 that ejects an ink droplet onto paper medium, a tank 13 that supplies ink to the inkjet head 12, and a circulation mechanism 14 that circulates the ink between the inkjet head 12 and the tank 13. The inkjet head 12 includes nozzles 31 through which an ink droplet is ejected onto paper medium. The aqueous inkjet ink of the present embodiment is stored in the tank 13.

The tank 13 includes an atmosphere open valve 15. The atmosphere open valve 15 opens to make the pressure inside the tank 13 an atmospheric pressure. The pressure inside the tank 13 can vary from the atmospheric pressure by closing the atmosphere open valve 15.

The liquid level (meniscus) inside the nozzles 31 of the inkjet head 12 is higher than the liquid level h inside the ink tank 13 in the direction of gravitational force. The pressure inside the head 12 is thus negative, and the ink does not leak out from the nozzles 31.

The circulation mechanism 14 includes a circular channel 16, and a pump 17 and a filter member 18 are provided in series midway through the channel 16. The pump 17 on the upstream side circulates the inkjet ink through the channel 16 in the direction of arrow. The filter member 18 downstream of the pump 17 collects foreign objects in the ink.

Figure 2:
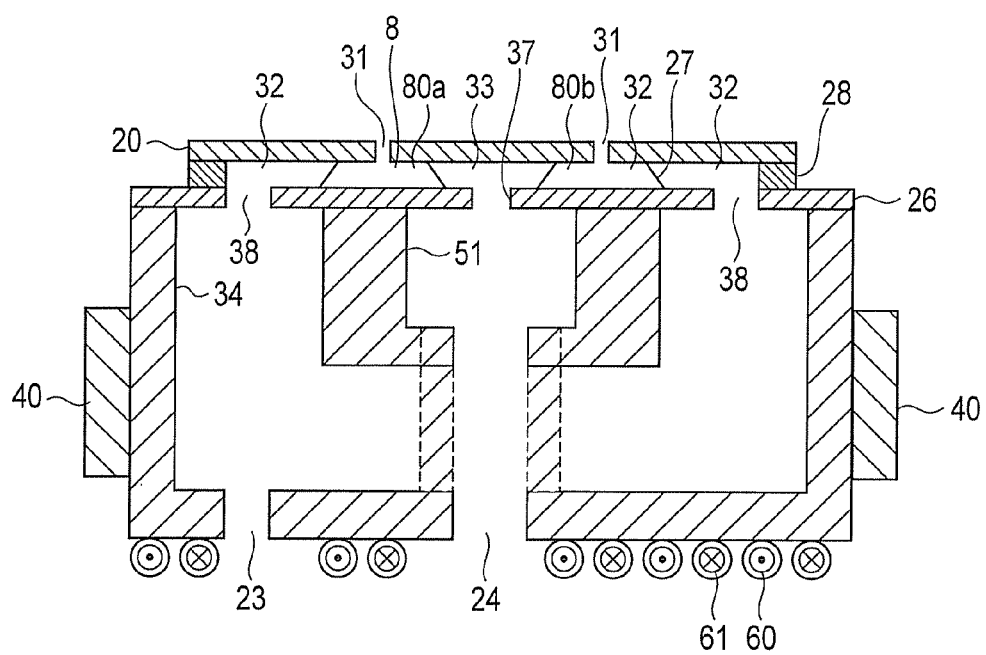
FIG. 2 is a cross sectional view illustrating an example of an inkjet head.

As illustrated in FIG. 2, in the inkjet head 12, piezoelectric elements 27 are provided on a substrate 26 that has a second ink supply holes 37 and second ink discharge holes 38. The piezoelectric elements 27 are disposed along the direction orthogonal to the plane of the paper, and the space between the adjacent piezoelectric elements 27 is a pressure chamber 8. That is, a plurality of pressure chambers 8 is disposed along the direction orthogonal to the cross section represented in FIG. 2. Two columns of pressure chambers are provided: a first pressure chamber column 80a, and a second pressure chamber column 80b.

A nozzle plate 20 is disposed on the substrate 26 via a frame member 28. The nozzles 31 that eject the ink are provided through the nozzle plate 20. The openings of the nozzles 31 are larger on the pressure chamber 8 side than on the ink ejection side. The nozzles 31 are provided in columns, corresponding to the pressure chambers 8. Two columns of nozzles are first and second nozzle columns corresponding to the first pressure chamber column 80a and the second pressure chamber column 80b, respectively.

The number of nozzles 31 disposed in each nozzle column is 300 nozzles/inch. The distance between the adjacent nozzles in the nozzle columns along the lengthwise direction is 84.7 μm. The two nozzle columns are offset by 42.3 μm along the lengthwise direction of the nozzle columns. The inkjet head 12 is therefore capable of 600 dpi (dots/inch) printing.

The second ink supply holes 37 through the substrate 26 are in communication with a supply-side common pressure chamber 33 between the nozzle plate 20 and the substrate 26. The supply-side common pressure chamber 33 is disposed between the first pressure chamber column 80a and the second pressure chamber column 80b. The space between each pressure chamber column and the frame member is a discharge-side common pressure chamber 32. The discharge-side common pressure chambers 32 are in communication with the second ink discharge holes 38 provided through the substrate 26.

The ink is supplied through the first ink supply hole 24, and flows through an ink supply groove 51, the second ink supply hole 37, the supply-side common pressure chamber 33, the pressure chamber 8, the discharge-side common pressure chamber 32, the second ink discharge hole 38, an ink discharge groove 34, and a first ink discharge hole 23, in this order. The ink circulation pathway follows this route.

The volume of the pressure chambers is varied by driving the piezoelectric elements on the both sides of the pressure chambers. Dilating the pressure chamber supplies the ink into the pressure chamber. Contracting the pressure chamber ejects the ink through the nozzles. The ink that was not ejected travels through the ink circulation pathway, and supplied again through the first ink supply hole 24.

Hot water pipes 60 and 61 are provided on the outer wall of the inkjet head 12. The hot water pipes 60 and 61 are provided as a heat-retaining mechanism with which hot water is circulated to keep the head warm, and are fixed on the outer wall of the head with an adhesive having high heat conductivity. In the hot water pipe 60, hot water is supplied into the plane of the paper. The hot water is supplied in the opposite direction in the hot water pipe 61, in a direction out of the plane of the paper. The head temperature is set with a thermistor (not illustrated). The hot water is heated according to the head temperature.

A Peltier element 40 is provided on the outer wall of the inkjet head 12. The Peltier element 40 is provided as a cooling mechanism that endothermically cools the inkjet head 12. The cooling mechanism may be realized by a pipe provided around the head to circulate a coolant.

With the heat-retaining mechanism used with the cooling mechanism, the temperature of the inkjet head 12 can be maintained in an appropriate range.

In this manner, the temperature of the ink in the inkjet head 12 is controlled to obtain the optimum viscosity for ejection. The temperature of the ink inside the inkjet head 12 is 45° C. or more. The head temperature tends to increase by the self-heating of the head following, for example, the oscillations of the piezoelectric element 27. The viscosity of the ink in the head can be maintained in the optimum range for ejection by the self-heating of the inkjet head combined with ink circulation and the heat-retaining mechanism. The aqueous inkjet ink of the present embodiment has a viscosity range appropriate for inkjet recording, and can thus be stably ejected through the head. The viscosity of the ink before being ejected through the inkjet head corresponds to $V_B$.

The temperature of the atmosphere outside the inkjet head 12 is about 30° C. with the ink being kept warm in the inkjet head 12 as above. The ink is ejected through the nozzles 31 of the inkjet head 12 in the form of micro ink droplets of generally about several microliters. The ink droplets ejected out of the nozzles is rapidly cooled from temperatures of 45° C. and higher to temperatures around 30° C., and the ink viscosity increases. The increased viscosity corresponds to $V_A$.

The temperature of the paper medium, receiving the ink droplets is about 25 to 35° C. The viscosity of the aqueous inkjet ink in contact with low-temperature paper medium further increases, and permeability to the paper medium decreases further. As a result, the pigments in the ink do not permeate into the paper medium, but remain in the vicinity of the surface. Because essentially all of the pigments in the ink contribute to color development, a sufficiently dense image can be formed on the paper medium even with less than normal levels of the pigments contained in the ink.

As used herein, the "paper medium" generally refers to various kinds of paper medium intended for printing. The paper medium can be broadly classified into coated paper and non-coated paper, the former including art paper and compound paper to which materials for improving print characteristics are applied, and the latter representing a class of papers that exploits the characteristics of the paper itself. The paper medium has a variety of applications, such as in books, documents, newspaper, wrapping, and printer papers. The paper medium also includes thick papers such as cardboards, paper containers, and boxboards. For example, plain papers as represented by copy papers for the copiers and printers used in offices and homes are a typical example of paper medium.

The aqueous inkjet ink of the present embodiment has high viscosity unless the ink temperature is maintained at 45° C. or more. This characteristic was obtained by mixing a water-soluble polyhydric alcohol having a weight average molecular weight of 400 or more. The aqueous inkjet ink of the present embodiment includes a water-soluble polyhydric alcohol having a weight average molecular weight of 400 or more, in addition to water and the pigment.

The water may be, for example, pure water or ultrapure water. The amount of water in the aqueous inkjet ink is not particularly limited. However, the excess amount of water may cause distortion in the paper medium, for example, by curling the paper. Such distortion in paper medium can be avoided with less than 70 mass % of water in the total amount of the ink. The amount of water in the aqueous inkjet ink is preferably less than 60 mass %, most preferably less than 50 mass % of the total amount of the ink.

Examples of the pigments include azo pigments (including azolake pigment, insoluble azo pigment, condensed azo pigment, and chelate azo pigment), polycyclic pigments (for example, phthalocyanine pigment, perylene pigment, perinone pigment, anthraquinone pigment, quinacridone pigment, dioxazine pigment, thioindigo pigment, isoindolinone pigment, and quinophthalone pigment), dye chelates (for example, basic dye chelate, and acidic dye chelate), nitro pigments, nitroso pigment, and aniline black.

Specific examples of carbon black usable as black ink include No. 2300, No. 900, MCF 88, No. 33, No. 40, No. 45, No. 52, MA 7, MA 8, MA 100, No2200B (Mitsubishi Chemical Corporation), Raven 5750, Raven 5250, Raven 5000, Raven 3500, Raven 1255, Raven 700 (Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400 (Cabot Corporation), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (Degussa).

Specific examples of pigments usable as yellow ink include C. I. Pigment Yellow 1, C. I. Pigment Yellow 2, C. I. Pigment Yellow 3, C. I. Pigment Yellow 12, C. I. Pigment Yellow 13, C. I. Pigment Yellow 14C, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 109, C. I. Pigment Yellow 110, C. I. Pigment Yellow 114, C. I. Pigment Yellow 128, C. I. Pigment Yellow 129, C. I. Pigment Yellow 138, C. I. Pigment Yellow 150, C. I. Pigment Yellow 151, C. I. Pigment Yellow 154, C. I. Pigment Yellow 155, C. I. Pigment Yellow 180, and C. I. Pigment Yellow 185.

Specific examples of pigments usable as magenta ink include C. I. Pigment Red 5, C. I. Pigment Red 7, C. I. Pigment Red 12, C. I. Pigment Red 48(Ca), C. I. Pigment Red 48 (Mn), C. I. Pigment Red 57(Ca), C. I. Pigment Red 57:1, C. I. Pigment Red 112, C. I. Pigment Red 122, C. I. Pigment Red 123, C. I. Pigment Red 168, C. I. Pigment Red 184, C. I. Pigment Red 202, and C. I. Pigment Violet 19.

Specific examples of pigments usable as cyan ink include C. I. Pigment Blue 1, C. I. Pigment Blue 2, C. I. Pigment Blue 3, C. I. Pigment Blue 15:3, C. I. Pigment Blue 15:4, C. I. Pigment Blue 15:34, C. I. Pigment Blue 16, C. I. Pigment Blue 22, C. I. Pigment Blue 60, C. I. Vat Blue 4, and C. I. Vat Blue 60.

The average particle size of the pigments preferably ranges from about 10 to 300 nm. Within this range, there will be no clogging in the inkjet head during the use in an inkjet recording apparatus. The more preferred average particle size range of the pigments is about 10 to 200 nm.

The average particle size of the pigments can be measured with a particle size analyzer using a dynamic light scattering method. Examples of particle size analyzer include HPPS (Malvern).

The pigments may be used in a dispersed state. The pigment dispersion can be prepared by dispersing the pigments in, for example, water or alcohol, using a dispersant. Examples of dispersant include surfactants, water-soluble resins, and water-insoluble resins. Self dispersion-type pigments also may be used.

Self dispersion-type pigments are those dispersible in water or in other medium without dispersants, and including at least one of functional groups selected from a carbonyl group, a carboxyl group, a hydroxyl group, and a sulfone group, or salts thereof, bound to the pigments by surface treatment. Examples of surface treatment include a vacuum plasma process, a diazo coupling process, and an oxidation treatment. By a predetermined surface treatment, a functional group or a molecule containing a functional group is grafted to the pigment surface. Self dispersion-type pigments can be obtained in this manner.

Self dispersion-type pigments have superior dispersion stability in water and higher adsorbability for paper medium compared to other pigments in pigment dispersions. Inks containing self dispersion-type pigments are therefore capable of forming higher quality images.

In the present embodiment, the amount of pigment is specified to less than 5 mass % of the total amount of the aqueous inkjet ink. With an amount equal to or greater than 5 mass %, the cost cannot be reduced, and clogging becomes likely in the head or in other parts of apparatus. More preferably, the pigment amount is less than 4 mass % of the total amount of the aqueous inkjet ink, most preferably less than 3 mass %. The aqueous inkjet ink generally contains the pigments in 1.5 mass % or more of the total amount.

The aqueous inkjet ink of the present embodiment contains a water-soluble polyhydric alcohol having a weight average molecular weight of 400 or more. The water-soluble polyhydric alcohol serves as a thickener that improves the viscosity of the aqueous inkjet ink at ordinary temperature. With a weight average molecular weight less than 400, the viscosity at 30° C. cannot be increased to 10 mPa·s or higher. The upper limit of the weight average molecular weight of the water-soluble polyhydric alcohol is not particularly limited, and is generally about 10,000.

Examples of the water-soluble polyhydric alcohol used include polyethylene glycol, polypropylene glycol, polyglycerin, and polyetherpolyol. The water-soluble polyhydric alcohol may be used either alone or in combinations of two or more. More than one water-soluble polyhydric alcohol of different weight average molecular weights also may be used.

The amount of water-soluble polyhydric alcohol in the aqueous inkjet ink preferably ranges from 10 to 60 mass % of the total amount of the aqueous inkjet ink. With the water-soluble polyhydric alcohol contained in this range, an ink can be obtained whose viscosity at ordinary temperature falls in the predetermined range. More than one water-soluble polyhydric alcohol of different weight average molecular weights, if used together, should be mixed in appropriate amounts to make the viscosity at 30° C. 20 mPa·s or more.

The aqueous inkjet ink of the present embodiment can be prepared by mixing, for example, the pigment dispersion, water, and the water-soluble polyhydric alcohol.

Additionally, a surfactant may be mixed to optimize ink characteristics such as ejection performance and permeability.

Examples of surfactant include polyoxyethylene alkyl ether, polyoxyalkylene alkyl ether, polyoxyethylene polycyclic phenyl ether, polyoxyalkylene polycyclic phenyl ether, glycerin fatty acid ester, and dimethylol heptane EO adducts.

Use of acetylene glycol-based surfactants or fluorosurfactants is also possible. Examples of acetylene glycol-based surfactants include 2,4,7,9-tetramethyl-5-decyne-4,7-diol, 3,6-dimethyl-4-octine-3,6-diol, and 3,5-dimethyl-1-hexin-3-ol. Specific examples include Surfynol 104, 82, 465, 485, and TG (Air Products).

Examples of fluorosurfactants include perfluoroalkylethylene oxide adducts, perfluoroalkylamine oxide, perfluoroalkyl carboxylate, and perfluoroalkyl sulfonic acid. Specific examples include Megafac F-443, F-444, F-470, F-494 (DIC Corporation), Novec FC-430, FC-4430 (3M), and Surflon S-141, S-145, S-111N, S-113 (AGC Seimi Chemical Co., Ltd.).

The surfactant can exhibit desirable effects if contained in about 0.1 to 2 mass % of the total amount of the ink, without causing any problem.

Of the surfactants exemplified above, for example, the acetylene glycol-based surfactants, and non-ionic surfactants can be used as dispersants for preparing the pigment dispersion.

As required, additives such as a pH adjuster, a preservative, and an anti-fungal agent may be mixed.

Examples of pH adjuster include potassium dihydrogen phosphate, disodium hydrogen phosphate, and sodium hydroxide.

Examples of preservative and anti-fungal agent include sodium benzoate, sodium pentachlorophenolate, 2-pyridinethiol-1-oxidesodium, sodium sorbate, sodium dehydroacetate, and 1,2-dibenzisothiazolin-3-one (Proxel CRL, Proxel BDN, Proxel GXL, Proxel XL-2, Proxel TN; all registered trademarks of ICI).

Use of these additives further improves print image quality and preservation stability.

Further, additives, for example, such as a penetrant, intended for improving certain ink characteristics also may be mixed. The amount of additive should be appropriately selected, provided that it can be dissolved or dispersed in water. For example, poorly-soluble additives may be used with solubilizers or the like. In any case, it is desirable that additives be added to the extent that is not detrimental to the dispersion stability of the pigments.

A specific example of the aqueous inkjet ink is described below.

Aqueous inkjet inks were prepared by mixing the components in the formulations presented in Table 1. The numerical value for each component in Table 1 is parts by mass. Surfynol 465 (Nissin Chemical Industry Co., Ltd.) was used as surfactant.

The pigment dispersion is a self dispersion-type pigment dispersion (CAB-O-JET-300, Cabot). In the self dispersion-type pigment dispersion, pigments with surface functional groups are dispersed in water. The pigment content in the pigment dispersion (solid component) is 15 mass %. The amounts presented in Table 1 are the amounts of pigment dispersions containing water and the pigments.

TABLE 1

| No. | Pigment dispersion | Pire water | Water-soluble polyhydric alcohol | | surfactant |
|---|---|---|---|---|---|
| | | | PEG1000 | PEG400 | |
| 1 | 20 | 33 | 50 | 0 | 1 |
| 2 | 20 | 28 | 45 | 5 | 1 |
| 3 | 20 | 3 | 80 | 0 | 1 |
| 4 | 20 | 33 | 35 | 15 | 1 |
| 5 | 20 | 53 | 0 | 30 | 1 |
| 6 | 40 | 16 | 5 | 45 | 1 |
| 7 | 20 | 23 | 60 | 0 | 1 |
| 8 | 20 | 23 | 40 | 20 | 1 |

TABLE 1-continued

| No. | Pigment dispersion | Pire water | Water-soluble polyhydric alcohol | | surfactant |
|---|---|---|---|---|---|
| | | | PEG1000 | PEG400 | |
| 9 | 20 | 23 | 30 | 30 | 1 |
| 10 | 20 | 23 | 25 | 35 | 1 |
| 11 | 20 | 18 | 65 | 0 | 1 |
| 12 | 20 | 53 | 30 | 0 | 1 |
| 13 | 20 | 48 | 35 | 0 | 1 |

Polyethylene glycol (Sanyo Chemical Industries, Ltd.) was used for the water-soluble polyhydric alcohols (PEG 1000 and PEG 400). These alcohols have weight average molecular weights of 1,000 and 400, respectively.

The pigment content in each aqueous inkjet ink is presented in Table 2 below.

TABLE 2

| No. | Pigment (mass %) |
|---|---|
| 1 | 2.87 |
| 2 | 2.87 |
| 3 | 2.87 |
| 4 | 2.87 |
| 5 | 2.87 |
| 6 | 5.58 |
| 7 | 2.87 |
| 8 | 2.87 |
| 9 | 2.87 |
| 10 | 2.87 |
| 11 | 2.87 |
| 12 | 2.87 |
| 13 | 2.87 |

The viscosity of aqueous inkjet inks obtained as above was measured using a cone plate-type viscometer. The viscometer, VISCOMETER TV-22 (Toki Sangyo Co., Ltd.), was used to measure the viscosities of each aqueous inkjet ink at predetermined temperatures with a 0.8°×R24 cone rotor rotated at 20 rpm.

The measured viscosity at 30° C. is $V_A$, and at 45° C. $V_B$.

$V_A/V_B$ values were calculated from the measured values $V_A$ and $V_B$. The results are presented in Table 3, along with the measured values.

TABLE 3

| No. | $V_A$ | $V_B$ | $V_A/V_B$ |
|---|---|---|---|
| 1 | 22 | 13 | 1.69 |
| 2 | 20 | 10 | 2.00 |
| 3 | 30 | 18 | 1.67 |
| 4 | 17 | 9 | 1.89 |
| 5 | 5.5 | 4 | 1.38 |
| 6 | 11 | 7.5 | 1.47 |
| 7 | 21 | 13.8 | 1.52 |
| 8 | 19.2 | 12.2 | 1.57 |
| 9 | 15.2 | 9.8 | 1.55 |
| 10 | 10.8 | 6.5 | 1.66 |
| 11 | 25 | 16.1 | 1.55 |
| 12 | 7.2 | 5.2 | 1.38 |
| 13 | 9.5 | 6.2 | 1.53 |

The aqueous inkjet inks obtained as above were evaluated for their preservation stability, ejection stability, and image density. The evaluation methods are as follows.

(Preservation Stability)

A 100-cc ink sample was placed in a glass sample vial, which was then sealed and stored in a 65° C. constant-temperature bath. After 1 week, the viscosity of the ink sample at 30° C. was measured as above to obtain $V_{A7}$.

Changes in viscosity was evaluated as the percentage increase represented by $100((V_{A7}-V_A)/V_A)$, where $V_{A7}$ is the viscosity at 30° C. after 1 week, and $V_A$ the initial viscosity at 30° C. A percentage viscosity increase less than 10% was regarded as good, and 10% or more poor.

(Ejection Stability)

An inkjet recording apparatus equipped with a CF1 head (Model Number; Toshiba Tec) was used to continuously print plain paper used as paper medium. The CF1 head has the ink circulation pathway, and a head-retaining function with circulation water. Under circulating ink, the head temperature and ink tank temperature of 45° C. were confirmed, and plain paper was continuously printed at the maintained head temperature of 45° C. Toshiba copy paper was used as the plain paper.

Immediately after the printing, the presence or absence of disturbed or sketchy images was visually checked, and stability was determined according to the following criteria. Practically, there is no problem with score A or B.

A: No sketchy image or other image failure
B: Practically no problem, sketchy images are present
C: Ejection failure, practically unusable (Image Density)

The density of a solid image formed on the plain paper with the inkjet recording apparatus was measured. Three 4-pl (picoliter) droplets of ink were continuously applied on the same position from a single nozzle to form a single pixel. A 1-cm² solid image was formed in 600 dpi (dots/inch). The prints were left to stand for 1 day, and the image density was measured using a spectrophotometer (X-Rite). The image density was determined according to the following criteria.

Good: Image density of 1.3 or more
Bad: Image density less than 1.3

The results are summarized in Table 4 below, together with cost effectiveness. Cost effectiveness was evaluated based on the pigment content in the ink. Cost effectiveness was regarded as good with a content less than 5.0 mass %, and bad with 5.0 mass % or more.

TABLE 4

| No. | Preservation stability | Ejection stability | Image density | Cost effectiveness |
|---|---|---|---|---|
| 1 | Good | B | Good | Good |
| 2 | Good | A | Good | Good |
| 3 | Bad | C | Good | Good |
| 4 | Good | A | Good | Good |
| 5 | Good | B | Bad | Good |
| 6 | Good | A | Good | Bad |
| 7 | Good | B | Good | Good |
| 8 | Good | B | Good | Good |
| 9 | Good | A | Good | Good |
| 10 | Good | A | Good | Good |
| 11 | Bad | C | Good | Good |
| 12 | Good | A | Bad | Good |
| 13 | Good | A | Bad | Good |

As presented in Table 4, preservation stability and ejection stability are poor in ink Nos. 3 and 11. As presented in Table 3, ink Nos. 3 and 11 have $V_B$ values of 18 mPa·s and 16.1 mPa·s, respectively, in excess of 15 mPa·s. Because of the large $V_B$ values, these inks cannot be stably ejected through the inkjet head.

Image density and cost effectiveness cannot be realized at the same time with ink Nos. 5, 6, 12, and 13. As presented in Table 3, ink Nos. 5, 12, and 13 have small $V_A$ values less than 10 mPa·s. Because of small $V_A$ values, the permeation of these inks into the paper medium cannot be suppressed, and image density cannot be improved. Ink No. 6 has a pigment content in excess of 5.0 mass %, as presented in Table 2.

Aqueous inkjet ink Nos. 1, 2, 4, 7 to 10 all have $V_A$ values of 10 mPa·s or more, $V_B$ values of 3 to 15 mPa·s, and $V_A/V_B$ of 1.5 or more. The viscosity condition was satisfied with the water-soluble polyhydric alcohol that had a weight average molecular weight of 400 or more. The pigment contents in ink Nos. 1, 2, 4, 7 to 10 are less than 5 mass %.

By satisfying all these conditions, the aqueous inkjet inks have excellent preservation stability and ejection stability, and high cost effectiveness. Further, the inks can be used to form a high-quality image on paper medium.

The aqueous inkjet ink of the embodiment can thus be obtained at low cost with excellent ejection stability, and can be used to form a sufficiently dense image on paper medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An aqueous inkjet ink comprising:
   a dispersion medium comprising water and a water-soluble polyhydric alcohol having a weight average molecular weight of 400 or more; and
   a pigment accounting for less than 5 mass % of a total amount of the aqueous inkjet ink,
   the aqueous inkjet ink having viscosities (mPa·s) measured using a cone-plate type viscometer at 20 rpm and satisfying the following relationships:

$V_A/V_B \geq 1.5$ $V_A \geq 10$ mPa·s $3$ mPa·s $\leq V_B \leq 15$ mPa·s, where $V_A$ is the viscosity at 30° C., and $V_B$ the viscosity at 45° C.

2. The ink according to claim 1, wherein the $V_A$ is 15 mPa·s or more.

3. The ink according to claim 1, wherein the $V_A/V_B$ is 2.0 or more.

4. The ink according to claim 1, wherein the pigment is a self dispersion-type pigment.

5. The ink according to claim 1, wherein an amount of the pigment is less than 3 mass % of the total amount of the aqueous inkjet ink.

6. The ink according to claim 1, wherein an amount of the pigment is 1.5 mass % or more of the total amount of the aqueous inkjet ink.

7. The ink according to claim 1, wherein the water-soluble polyhydric alcohol is selected from the group consisting of polyethylene glycol, polypropylene glycol, polyglycerin, and polyetherpolyol.

8. The ink according to claim 1, wherein an amount of the water-soluble polyhydric alcohol is from 10 to 60 mass % of the total amount of the aqueous inkjet ink.

9. The ink according to claim 1, further comprising a surfactant.

10. The ink according to claim 9, wherein an amount of the surfactant is 0.1 to 2 mass % of the total amount of the aqueous inkjet ink.

11. The ink according to claim 1, wherein the aqueous inkjet ink is used in a recording apparatus equipped with an inkjet print head having a heat-retaining function.

12. A method for inkjet printing comprising:
forming an image by ejecting at least one ink composition onto a paper medium from an inkjet print head having a heat-retaining mechanism, the ink composition being the aqueous inkjet ink of claim 1.

13. The method according to claim 12, wherein the inkjet ink is ejected through the inkjet head at a temperature of 45° C. or more.

14. The method according to claim 12, wherein the paper medium on which the inkjet ink is ejected has a temperature of 25 to 35° C.

15. The method according to claim 12, wherein the heat-retaining mechanism is a hot water pipe provided on an outer wall of the inkjet head to circulate hot water.

16. The method according to claim 12, wherein the inkjet head comprises a piezoelectric element.

17. The method according to claim 16, wherein the inkjet head self-generates heat by oscillations of the piezoelectric element.

18. The method according to claim 17, wherein the inkjet ink is kept warm using the generated heat of the inkjet head as a heat source.

19. The method according to claim 12, wherein the temperature of the inkjet ink is maintained in a predetermined range by a cooling mechanism.

* * * * *